Figure 1:
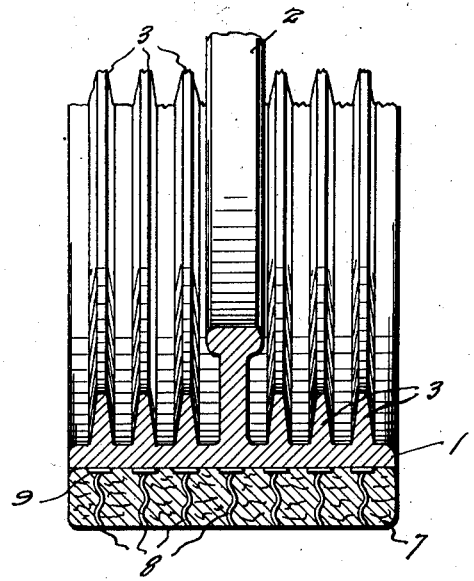

Aug. 29, 1933.  R. J. NORTON  1,924,622

BRAKE APPARATUS

Filed Dec. 12, 1930

Inventor
RAYMOND J. NORTON
By and Semmes & Semmes
M. W. McConkey
Attorney

Patented Aug. 29, 1933

1,924,622

UNITED STATES PATENT OFFICE 1,924,622

BRAKE APPARATUS

Raymond J. Norton, Washington, D. C., assignor to Bendix Brake Company, South Bend, Ind., a corporation of Illinois Application December 12, 1930
Serial No. 501,942

6 Claims. (Cl. 188—264)

This invention relates to brake apparatus and more particularly to an improved brake shoe structure.

With the advent of power multiplication brakes of the servo type and with the general improvement in construction of automobiles resulting in increased speed, the problem of dissipation of the heats generated by frictional braking has become important.

Heretofore comparatively little effort has been expended in attempting to rapidly and effectively dissipate heat generated in frictional brakes. For the large part prior improvements have consisted merely in providing the exterior of the brake drums with heat radiating fins or by so modifying the exterior surface of the drum as to increase its heat dissipation characteristics.

Heretofore no attempt has been made to effectively utilize the brake shoe as a dissipator of the generated heats of friction. This member when used as a heat dissipator obviously presents advantages over the brake drum. The friction facing is almost universally attached to the brake shoe. The generated heats of friction most deleteriously effects this friction facing because it is a non-metallic material and at high braking temperatures is subjected to decomposition. The heat which is generated in the brake drum due to the frictional braking is very rapidly conducted through the metal to the exterior dissipating surface. The friction material however, being a poor conductor of heat, largely retains the generated heats and hence temperatures build up in this material very rapidly. During normal operation the friction facing is in intermittent and momentary contact with the drum so that while the brake drum cools down relatively rapidly after an application of the brake, the friction facing retains the generated heats for a longer period of time.

The major object of the present invention is to provide an improved brake shoe which rapidly conducts away and dissipates generated frictional heats.

Another object is to modify brake shoes so as to cause them to subserve a cooling function in brake operation.

Another object is to provide a novel combination of a brake shoe of high heat dissipating efficiency and an improved friction material which though largely comprised of substantially non-conductive material has incorporated therein materials of high conductivity.

Yet another object is to provide an improved brake shoe and attached friction facing.

A further object is to generally improve brake construction.

As indicated hereinbefore, the problem of cooling brake apparatus has been attempted to be solved only by modifications of the brake drum. While this member is an effective dissipator, due to its metallic construction, its large area of surface exposure and its subjection to convective cooling currents, it is nevertheless inefficient as a heat dissipator to the extent that the contact between it and the shoe is not of a sufficiently tight character to permit for effective conduction of heat away from the friction facing.

The real thermal problem is the cooling of the brake band. While it is inadvisable to allow too great an increase in the temperature of the metal of the brake drum, yet this member, by reason of its metallic construction, can withstand relatively high temperatures without any particular disadvantage. The friction material on the other hand is made up in part of natural or synthetic resins which, when subjected to elevated temperatures, undergo decomposition to variant extents. This is particularly true of the molded friction facings which embody a synthetic resin. When the temperature of this material is raised very high the material shrinks due to the evolution of volatiles such as phenol, and at still higher temperatures it tends to decompose or carbonize.

According to the present invention the friction facing itself may be directly and positively cooled by utilizing either of two expedients. The first of these is the provision of a multiplicity of metallic conductors extending from the frictional engaging surface transversely through the friction material so as to conduct heat away from the heat generating surface. In conjunction with this friction material is employed a brake shoe, the circumferential flange of which very tightly abuts the protruding portions of the metallic thermal conductors so as to form a tight mechanical connection. The brake shoe is provided with means for increasing the rate of heat dissipation therefrom. This means may take the form of a plurality of heat radiating fins connected to the circumferential flange. Since the shoe is inside of the backing plate and thereby protected against any mechanical contact, these heat radiating fins need not be of very heavy structure. While it is obvious that the metal of the shoe may be shaped out to form a number of these radiating fins, it is likewise within the scope of the invention to attach relatively light weight and large area fins either of the same or different metal to the shoe.

Figure 2:
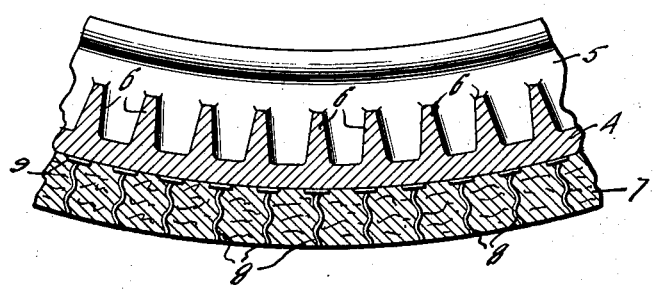

In order to more clearly explain the invention preferred embodiments of it are shown in the drawing, of which Figure 1 is an enlarged detail cross section of one form of shoe; and Figure 2 is a detail longitudinal section of another form.

In Figure 1 is shown a brake shoe structure comprising a brake shoe member having a circumferential flange 1 and an integral median rigidifying or strengthening flange 2, so that the two together form the well known T-shaped type of shoe. Either integrally formed with or detachably secured to the underside of the shoe flange are the heat radiating fins 3 of any desired shape and size. These are chosen of such size and of such a material as to give the most effective heat dissipation. In Figure 1 these are shown as being integral with the shoe structure, but obviously they may be of relatively thin sheet iron attached, as by spot welding, to the base of the flange. These members may extend downwardly a considerable distance toward the axis of rotation of the wheel and to such a degree as is permitted by the size of the axle or stub shaft and the associated brake apparatus. These fins may run circumferentially of the flange, as is shown in Fig. 1, or may be of serpentine shape so as to give an increased radiation area. Likewise the surface of these materials may be treated, as with paint or metal oxide, so as to increase the rate of heat dissipation therefrom.

As shown in Figure 2, the heat dissipating fins on the brake shoe may run laterally of the brake shoe flange. A brake shoe may be made up, for example, so as to present the friction facing attaching flange 4, the central rigidifying flange 5 and the transversely extending heat radiating fins 6.

The brake shoe member itself, made in accordance with the principles herein disclosed, namely with a very large heat dissipating area, is associated with a novel type of friction material. This may comprise a woven or felted asbestos bonded with natural heavy asphaltic material, such as gilsonite, or with synthetic resins of the phenol methylene type so as to provide friction block 7. Incorporated in this friction material are a large number of metal wires 8. Preferably these are of copper or some other metal having a high heat conductivity and are of relatively small gauge so as to minimize abrading action on the drum. At the underside of the lining these wires are extended, convoluted, folded back on themselves or otherwise shaped so as to provide for a relatively large area of contact between the wire and the associated metal of the shoe. This construction is illustrated in the drawing by the lateral extensions 9 on the end of the wires. Obviously in lieu of wires a large number of relatively small plugs or inserts of metals may be employed.

With this type of construction the wires have good mechanical contact with the metal of the shoe and, as they extend transversely through the friction facing, provide a multiplicity of metal paths from the friction engaging surface back to the metal of the brake shoe and thence to the heat radiating fins. In other words, with this arrangement a very large heat convection and heat radiating surface is provided on the shoe and the friction facing is so associated with the shoe as to insure maximum thermal conductivity therethrough. In short, a metallic thermal path is provided from the frictional engaging surface to the heat dissipating surfaces.

As noted hereinbefore, this type of structure presents decided advantages inasmuch as it withdraws the heat away from the friction facing and dissipates it rapidly through the medium of the brake shoe, the member which is permanently in contact with the friction facing.

The present type of shoe structure is to be carefully distinguished from the conventional form of shoes which are formed with a circumferential flange and either a central or marginal webs. These webs in the older types of construction were for the purpose of rigidifying the shoe and to subserve this function were of relatively massive construction and of no large area. In the present construction the heat radiating fins are not for the purpose of rigidifying the flange but for the purpose of providing the maximum area for the dissipation of heat by convection and conduction. Since problems of strength and rigidity are not involved in the utilization of these members, a wide variety of materials may be employed. As previously described, these fins may be of very light construction but are in general characterized by a very large area of surface exposure.

While only two forms of fins have been described, it is manifest that the invention is susceptible of wide modification, both as to the configuration of the fins and as to the material employed. Due to its high thermal conductivity copper may be used for these fins. However the economies of manufacture may be availed of by utilizing thin sheet metal. Where cast shoes are employed these fins may be cast integral with the shoe or may be separately attached. When the invention is embodied in an aluminum shoe, it is preferable to subject at least the surface of the fins to anodic oxidation so as to obtain the benefit of the high heat emissivity of the aluminum oxide. When using other metals, the radiating area may be coated with materials which are characterized by high heat emissivity, such as coatings of metal oxides.

Therefore, while definite physical embodiments have been described, it is to be understood that these are given merely as examples as the invention is considered to reside broadly in the idea of utilizing the brake shoe itself as a heat dissipating element. This improvement, particularly when coupled with the improved friction material providing for the rapid conduction of heat therethrough to the brake shoe and also in conjunction with a brake drum which is either provided with heat radiating fins or so treated as to increase the rate of heat dissipation, will insure a cooler brake mechanism with all of the attendant advantages.

I claim:

1. A brake member comprising a brake shoe provided with heat radiating fins, a bonded asbestos lining secured to the shoe and a highly heat conductive and substantially infusible means embodied in the lining and extending from the frictional engaging surface to the shoe and contacting with the shoe to transmit generated frictional heat from the frictional engaging surface to the shoe.

2. A brake member comprising a metallic brake shoe provided with heat radiating fins, a friction facing attached to the shoe, said facing having metallic wires embodied therein and which are substantially infusible at the temperature of braking operation and extending from the exposed frictional engaging surface of the facing, through said facing and contacting with tight mechanical contact with the metal of the shoe.

3. A brake apparatus comprising a metallic brake shoe having radiating fins thereon, an asbestos facing bonded with a synthetic resin attached to the shoe, said facing having a multiplicity of members of high heat conductivity and high melting point extending from the frictional engaging surface to the shoe and being maintained in tightly abutting relationship with the shoe.

4. In combination with a brake shoe having radiating fins a highly heat conductive bonded asbestos lining attached to the shoe, the lining having a large number of metallic members of high thermal conductivity and melting point, and contacting with the shoe at one side and adapted to contact with the brake drum on the other side of the lining.

5. A metal brake shoe having a circumferential flange, a rigidifying flange and a plurality of heat radiating fins, an attached friction facing on the shoe, said facing including metal members which are substantially infusible at braking temperatures contacting with the shoe and extending through the facing to an exposed position on the frictional engaging surface of the shoe.

6. A brake construction comprising a metal brake shoe having heat radiating surfaces thereon, a woven friction facing attached to the shoe, said facing having a plurality of metal wires contacting at one portion with the shoe and extending through the facing to the exposed frictional engaging surface thereof the side wires being highly heat conductive and infusible at the temperature of brake operation.

RAYMOND J. NORTON.